(12) United States Patent
Brú-Magniez et al.

(10) Patent No.: US 6,431,958 B1
(45) Date of Patent: Aug. 13, 2002

(54) METHOD FOR MECHANOCHEMICAL TREATMENT OF A MATERIAL

(75) Inventors: Nicole Brú-Magniez; Benrard Kurdyk, both of Paris; Claude Roques-Carmes, Besancon; Pascal Breton, Tigy; Joël Richard, Longues-Jumelles, all of (FR)

(73) Assignee: Virsol, Paris (FR)

( * ) Notice: Subject to any disclaimer, the term of this patent is extended or adjusted under 35 U.S.C. 154(b) by 0 days.

(21) Appl. No.: 09/623,468

(22) PCT Filed: Mar. 12, 1999

(86) PCT No.: PCT/FR99/00552
§ 371 (c)(1),
(2), (4) Date: Oct. 11, 2000

(87) PCT Pub. No.: WO99/47307
PCT Pub. Date: Sep. 23, 1999

(30) Foreign Application Priority Data

Mar. 13, 1998 (FR) .............................. 98 03116

(51) Int. Cl.⁷ ................................................ B24B 1/00
(52) U.S. Cl. ............................ 451/39; 451/38; 451/54; 451/55; 427/198; 427/205
(58) Field of Search ............................ 451/36, 38, 39, 451/40, 54, 55, 60; 427/198, 205

(56) References Cited

U.S. PATENT DOCUMENTS

| 2,016,600 | A | * | 10/1935 | Gray ........................ 427/198 |
|---|---|---|---|---|
| 3,765,923 | A | * | 10/1973 | Bender-Christensen ..... 427/205 |
| 3,869,834 | A | | 3/1975 | Mullin et al. |
| 4,575,396 | A | | 3/1986 | Matsumoto et al. |
| 4,634,603 | A | * | 1/1987 | Gruss et al. ................. 427/195 |
| 4,731,125 | A | | 3/1988 | Carr |
| 4,816,284 | A | * | 3/1989 | Magee ........................ 427/11 |
| 5,261,191 | A | | 11/1993 | Wick |
| 5,344,472 | A | * | 9/1994 | Lynn et al. .................... 451/38 |
| 5,405,648 | A | * | 4/1995 | Hermann ............... 427/213.31 |
| 5,433,654 | A | | 7/1995 | Clark, Jr. et al. |
| 5,964,644 | A | * | 10/1999 | Rhoades ...................... 451/39 |

FOREIGN PATENT DOCUMENTS

| DE | 2809595 | 9/1978 |
|---|---|---|
| GB | 969535 | 9/1964 |

* cited by examiner

Primary Examiner—Timothy V. Eley
(74) Attorney, Agent, or Firm—Dennison, Schultz & Dougherty

(57) ABSTRACT

The invention concerns a method for the mechanochemical treatment of a material characterised in that to improve said material surface properties by mechanochemical anchoring, such as in particular its adhesive capacity during subsequent assembling, or to improve its use properties by producing composite structure surface coatings, consisting in projecting on said material particles with laminated structure consisting of a core and a coating comprising at least a polymer and optionally a chemical agent, in conditions such that said particles and/or fragments resulting from their fracturing are embedded and/or penetrate into said material. The invention is applicable in dentistry, the biomedical field, motor industry, avionics, printing industries, agro-industry, mechanical industries.

20 Claims, 1 Drawing Sheet

METHOD FOR MECHANOCHEMICAL TREATMENT OF A MATERIAL

Figure 1:
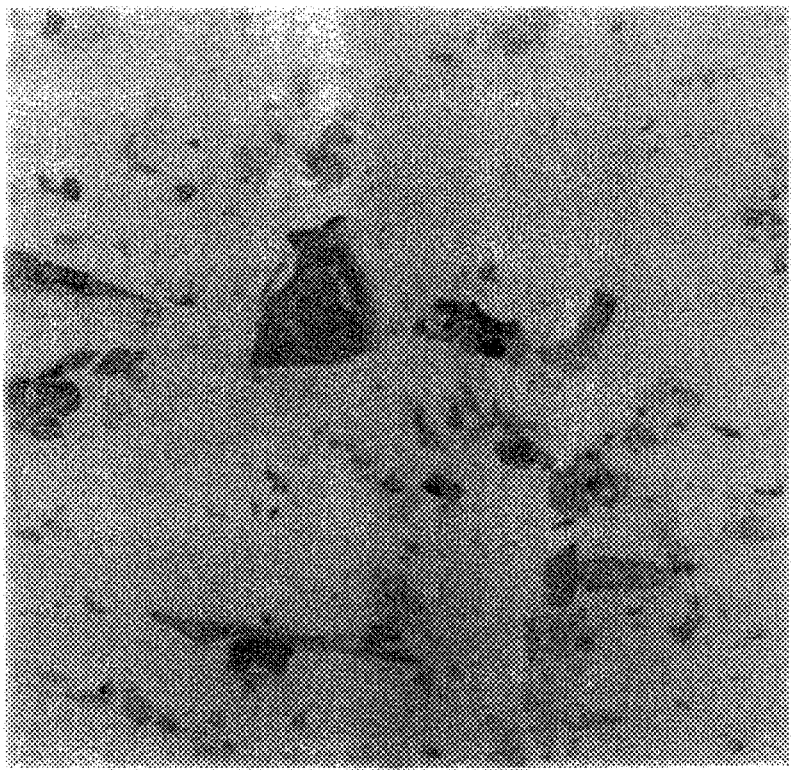

The present invention relates to a novel method of mechano-chemically treating a material which enables:
- on the one hand, improving, in one sole operation leading to a subsequent mechano-chemical anchoring, the surface properties of a material, such as, in particular, its aptitude to adherence during subsequent assemblings;
- on the other hand, improving the surface properties of use of a material by the simple carrying out of a coating having composite structures.

This invention finds a first series of applications in every field in which it is sought to improve the interface properties of a material with a view to its use with another material, in particular during assemblings, notably during sticking together of the two materials, or during the adhesive filling of cavities.

The principal fields concerned are odontology, the biomedical field, the preparation of carried products which use microtechniques, the field of the automobile industry, and that of the avionics industry.

Within this context, the invention more particularly applies to the treatment of metallic pieces with a view to improving the coherence and the reactivity of the interface between the metal and a polymer material generally constituting glue or the coating intended to be applied thereon.

This invention finds a second series of applications in every field in which it is sought to improve the surface properties of use of a material, in particular of a material covered with a polymer, by the incorporation in this covering of fillers which are notably ceramic fillers, mineral or metallic fillers, by thus preparing composite structures the polymer covering of which constitutes the matrix.

Within this context, the invention applies more particularly to the preparation of hard non-adhesive (anti-adhesive) coverings.

The principal fields concerned are the printing industries, (textile or paper), those of agri-foodstuffs, the mechanical industries, with applications in the automobile industry.

At present, in every operation of preparation of a surface with a view to its assemblage by sticking with another surface, one proceeds in a classical manner sequentially by carrying out successively:
- a mechanical treatment, by impacts of particles so as to generate a roughness intended to favour the mechanical anchoring;
- and then, a chemical treatment, by successive applications, notably by daubing onto the surface, or by pulverising onto the surface thus mechanically treated, various chemical products intended to improve the properties of adhesion and of adherence of this surface.

The mechanical methods of surface treatment which are the most frequently carried out in industry or in laboratories, such as, for example, sandblasting, shot blasting, balling, etc., are based on projecting various projectiles onto the surface to be treated preferably projectiles of abrasive character. All these methods give good results while being easy to use.

The projectiles which can be used in the context of the methods mentioned above are of various nature and are generally characterised by their nature, their shape, their dimensions, their particle size, their density, their integrity.

Industrially, the most commonly used projectile is spherical or angular steel shot, round or angular cast iron shot, aluminium or copper shot, glass microballs, shot of ceramic material of the alumina or silica type.

In micro-sandblasting, for the moment, alumina or corundum grains are most frequently employed. These grains possess active ridges which guarantee a high efficiency in terms of macro- and micro-roughness of a surface.

In the particular field of odontology in which numerous operations of assembling are carried out by sticking together a metallic material and a polymer material, essentially two methods are known which aim to improve the quality of metal-polymer interfaces. These are:
- on the one hand, a method developed by the company ESPE and known under the designation <<Rocatec® method>>; and
- on the other, a method developed by the company KULZER and known under the designation <<Silicoater MD® method>>.

The Rocatec® method enables carrying out a sandblasting qualified as a <<reactive>> sandblasting. This method starts off with a first sandblasting by alumina grains of about 250 µm, which is followed by a second sandblasting which uses alumina grains of size which is roughly equal to that of the preceding ones but which are covered in silica micro-grains. These two types of sandblasting are followed by a step of brush-depositing a layer of silane.

This method, which comprises three steps, necessitates the purchase of a specific sandblasting unit.

The Silicoater MD® method consists essentially in carrying out a deposit of silica onto the metallic surfaces by pyrolysis. This method, which does not comprise any sandblasting operation, does nevertheless necessitate a specific piece of equipment, and in particular a heating enclosure.

Thus, the methods of surface treatment which are classically used up to present with a view to carrying out a cohesive assembling necessitate the use of specific pieces of equipment and/or are generally carried out sequentially, and this manifests itself by the relatively significant latent periods between the mechanical and chemical treatments, even between various successive chemical operations, which risk disturbing the quality of the expected results.

It is in this context that the inventors have sought developing a method of treating a material which does not necessitate any specific piece of equipment and which notably enables improving the surface properties of this material, in one sole step, during which a mechanical treatment by impacts and a chemical treatment were carried out concomitantly, or enables improving the properties of use of this material by preparing a surface covering of composite structures.

The method developed in accordance with the present invention in order to attain this objective is essentially characterised by the fact that it comprises projecting onto a material particles having stratified structure which are constituted of a core and of a coating comprising at least one polymer and optionally a chemical agent, under conditions such that said particles and/or the fragments resulting from their fracturing become encrusted in and/or penetrate into said material.

According to a first embodiment, this method is intended to improve the surface properties of a material, and in particular its adherence during its assembling with a second material, and comprises projecting particles having stratified structure onto the surface of said material, under conditions such that said particles fragment during impact and become encrusted in said material.

An anchoring is thus obtained in one sole operation, at the surface of the material to be treated, of fragments of projected particles, and, consequently, an anchoring of their coating is thus obtained, this operation being designated in the present application by the expression "mechano-chemical anchoring".

In other words, the chemical reaction on the surface of the treated material is linked to a concomitant encrustation of the stratum or strata of the stratified particles, this encrustation improving the interfacial adhesion.

More generally, the expression "mechano-chemical" is understood as describing any operation which simultaneously comprises a mechanical component and a chemical component.

In this aspect, the present invention therefore enables carrying out, without any latent period between the various operations, a surface treatment of a material which groups together mechanical operations and chemical operations which are linked to the reactivity of the interfaces, and this provides a more particular advantage with respect to the treatments of the prior art which are always sequential.

Another advantage of this method resides in the fact that it does not necessitate any specific material for its implementation, it being possible for this implementation to be carried out with the aid of apparatuses which are classically used for mechanical operations of sandblasting, micro-sandblasting, shot blasting, or balling.

This method enables, inter alia, the preparation of a surface, in particular of a metallic surface, onto which it is desired to adhere or to join a different material, in particular a polymer material.

Many materials can be treated within the context of this method. Metallic materials, ceramics, polymers, as well as calcified materials will be cited in particular.

According to a particular characteristic of this method, particles having stratified structure the core of which is constituted of a grain or of a ball made from a intrinsically fragile material, such as, for example, a ceramic, in particular from alumina, or from silica, or from a material having a natural aptitude to fragment under impacts of imposed energy, such as, in particular, a steel ball, a cast iron ball or a glass ball, will be used as projectiles.

The core of the particles having stratified structure can even be made from a plastic material, or from a traditional sandblasting material such as kaolin or refractory materials.

According to another particular characteristic, in the case in which the second assembling material is a polymer, particles having stratified structure the coating of which comprises one or more strata comprising a polymer of chemical family which is analogous to that of said polymer constituting the second assembling material, will be used as projectiles.

According to a second embodiment, the method in accordance with the present invention is intended to improve the properties of use of a material, by carrying out coverings having composite structures and in this case, the projection of the particles having stratified structure will be carried out under conditions such that said particles fully penetrate into said material without significantly fragmenting.

This embodiment of the invention is particularly useful for treating a polymer material, such as, in particular, for covering a mono- or multi-layered structure.

Polytetrafluoroethylenes (teflon), silicones (vulcanising at ambient temperature or at high temperature) or polyurethanes, can be cited amongst the polymers which can be thus treated.

Other materials can be treated in the context of this method. Biomaterials will be cited in particular.

According to a particular characteristic of this method, particles having stratified structure the core of which is constituted of a grain or of a ball made from a ceramic material, from a metallic material, from a plastic material or even from a traditional sandblasting material such as kaolin or refractory materials, will be used as projectiles.

Materials such as carbides, nitrides, oxides, carbonitrides or mixtures of these compounds can be cited, such as, for example, ceramic materials constituting the core of the projectiles.

Materials based on copper, on aluminium or on transition metals of the 3d or 4f series can be cited, such as, for example, metallic materials constituting the core of the projectiles.

Alloys of these metals are also envisagable.

According to a particular characteristic, in the case in which the material to be treated forms a polymer covering of a mono- or multi-layered structure, particles having stratified structure the coating of which comprises one or more strata comprising a polymer of the same chemical nature as a stratum of said covering, will be used as projectiles.

The person skilled in the art will easily understand upon reading the present description that it will be necessary for the nature and the dimensions of the particles having stratified structure, the nature of the material to be treated, as well as the conditions of the projection of said particles (their speed in particular) to be selected as a function of the surface properties or properties of use sought after.

For example, in the case of a surface treatment with a view to a sticking together, the person skilled in the art will select these various parameters in such a way that:

the size and the hardness of the particles having stratified structure be sufficient in order to create a surface roughness which favours the mechanical anchoring, the constituents of the particles having stratified structure be able to rupture under impact, in such a way that, after fracturations or cracks, an encrustation of a fragment of the particle and of a part of the layer(s) of coating material be able to be observed on the surface of the material to be treated.

For a further example, in the case of a treatment intended to carry out a composite covering, the person skilled in the art will select the nature of the particles having stratified structure, and will regulate the speed of projection in such a way that said particles be able to penetrate inside the material to be treated, without fragmenting.

Generally, whatever the result sought after, particles the dimensions of which are between 0.1 $\mu$m and 6 mm, preferably between 10 $\mu$m and 500 $\mu$m, will advantageously be selected.

It will be possible for the particles having stratified structure used within the context of the invention to be prepared by methods classically used for sugar-coating of particular products, and in particular by techniques of pulverisation in a fluidised gaseous bed, or by techniques of polymerisation in suspension, commonly used in microencapsulation.

Coating by pulverisation in a fluidised gaseous bed is perfectly systematised. The objective being to maintain the pulverulent products in suspension in the zone in which the encapsulating product is pulverised, so as to obtain a total coating of the particles.

If M is the mass of pulverulant solid product to be sugar-coated, and if m is the total mass of liquid products pulverised in order to carry out this operation, the theoretical encapsulation rate is provided by the formula:

$$\frac{m}{M+m} \times 100.$$

Generally, a rate of 10 to 20% is observed and procures the results sought after.

The efficiency of the encapsulation is generally verified on the Sweeping Electron Microscopy (SEM) scale.

The technique of pulverisation in a fluidised air bed favours the preparation of large amounts of products and applies particularly well to particles the size of which is between 50 μm and 4 mm.

This technique can be used in a sequential manner in order to deposit successive strata in the case of a multi-layered coating of the stratified particles.

Another method exists which enables creating real chemical bonds between the various strata, or between the core and the stratum immediately adjacent.

A polymerisation reaction can be carried out in order to favour the anchoring of the first stratum with the material selected for carrying out a second, peripheral stratum.

It will be possible for the system to be reproduced in a recurrent manner provided that there be in this case chemical bonds between the penultimate layers.

This technique will advantageously be selected for particles of low size ($\leqq 50$ μm) and advantageously for particles of size of the order of 0.5 μm.

It will be possible for the particles having stratified structure to be projected by means of projection devices which are usually used in surface treatment methods, especially compressed air or turbine devices.

The person skilled in the art will easily determine the implementation conditions of these devices and in particular the speed of projection of the particles, as a function of the objective sought after (surface treatment or preparation of a composite covering).

In the particular case of a surface treatment, it will be possible for the particles to be projected in the presence of a liquid carrier which is preferably constituted of water or of an aqueous solution.

According to a particular characteristic of the invention, and whatever the embodiment envisaged, it will be possible for the coating to comprise at least two strata, the stratum immediately in contact with the core of the particle optionally comprising a chemical agent intended to increase the adherence between said stratum and said core, or between said strata.

More generally, it will be possible for the coating to be constituted of a single stratum or of a plurality of strata and it will be possible for each stratum to comprise one or more chemical agents such as products known as adhesion promoters or an as adhesion primers.

In this context, <<adhesion promoter>> is understood as meaning any substance which enables modifying the chemical nature of a surface in order to optimise the adhesion with another surface, and <<adhesion primer>> is understood to mean any substance which enables facilitating the adhesion and the adherence of an adhesive.

Compounds which are generally designated in the field by the term <<silanes>> will be cited as examples of an adhesion promoter. These are bifunctional molecules which are capable of exchanging bonds with two different materials and one of which is a mineral. Thus, alkoxysilanes are advantageous insofar as:

certain functions of the silane can condense, when such is the case, with the hydroxyl groups borne by the surfaces of the element constituting the core of the composite particles, in order to form Si—O-metal bonds, it will be possible for the alkyl(acrylic or methacrylic) groups of the silane to subsequently polymerise, if need be with the monomers constituting the next coating layer. This is the case in particular when the composite particle comprises a first layer of alkoxysilane and a second layer, called peripheral layer, which is constituted of an acrylic polymer.

According to a variant, the particles having stratified structure will comprise an external layer or stratum which contains an adhesion primer and an underlying layer or stratum which contains an adhesion promoter.

Such particles constitute novel industrial products per se.

Of course, the choice of both the adhesion promoter and the adhesion primer will depend upon the nature of the element constituting the core of the composite particles and upon the objective sought after during the implementation of the method.

Thus, in a particular case in which it is sought to carry out a composite covering, it is generally advantageous to use as projectiles particles comprising one or more strata and the stratum of which immediately in contact with the core is fixed thereon by chemical bonds.

In the particular case in which it is sought to assemble two materials, by sticking together by means of an acrylic glue, composite particles will be selected the coating of which will be constituted or will comprise an acrylic compound the formulation of which will be close to that of the material forming the glue.

The present invention will now be illustrated by the following non-limiting Examples, which describe the sticking together of titanium pieces with a view to applications in odontological sciences.

EXAMPLES

I Principle and Protocol of the Test Used

The evaluation of the efficiency of the operation of mechanical and chemical preparation of the metallic titanium surfaces was measured by an adherence test standardised by an AFNOR standard (NFT76-114) adapted to the sizes of samples used in the dental art.

It is, in this case, a test in which a block constituted of two parallelepipedical metallic beams (L=40 mm, l=5 mm, e=2.5 mm) assembled with the aid of a joint of adhesive is subjected to an imposed separation.

This forced separation is obtained by the introduction, within the joint of glue, of a steel edge of calibrated size.

The rupture energy (Wr) is then easily accessible by measuring the length of the crack according to the classical formula:

$$\frac{3E\Delta^2 h^3}{16l^4}$$

wherein:

E represents the Young's modulus of the material to be assembled,

Δ the separation imposed by the edge, h the thickness of the test-tubes assembled by sticking together, l the length of the crack.

This test will serve as a basis for testing the quality of the various mechano-chemical operations carried out by sand-blasting in proceeding according to the invention (Examples 1 to 6 below). The results are to be compared with those obtained according to prior art (reference Comparative Examples).

II—Reference Comparative Examples

II-1: Results Obtained by the Sole Effect of Impacts of Non-treated Particles The values of rupture energy (Wr) of an acrylic resin of the PMMA type used in odontology, which are obtained in the test described above in using non-treated abrasive particles which only generate one mechanical anchoring were the following:

alumina particles of 50 $\mu$m: Wr=18 J/m$^2$
alumina particles of 125 $\mu$m: Wr=33 J/m$^2$
alumina particles of 250 $\mu$m: Wr=36 J/m$^2$
silica particles of 250 $\mu$m: Wr=110 J/m$^2$.

II-2: Results Obtained in Sandblasting Operations Followed by Brush-depositing Products of the Adherence Promoter and Primer Type 1) For the operations in which the preparation of the surfaces is carried out in a sequential manner by sandblasting with Al$_2$O$_3$ grains of 250 $\mu$m and then daubing the surface with the products of the silane type (promoter) and acrylic polymer (primer), the order of magnitude of Wr is:

$$Wr=130 \text{ J/m}^2.$$

2) For the same operations carried out with the aid of 250 $\mu$m silica grains followed by a brush-application of the same chemical products as those described above, the following average value was obtained:

$$Wr=250 \text{ J/m}^2.$$

3) For this same silica particle size 250 $\mu$m, the brush-application of the silane (promoter) alone provides a value of:

$$Wr=200 \text{ J/m}^2.$$

4) Brush-application of acrylic polymer without silane undercoat on a surface sandblasted beforehand with crude manufactured 250 $\mu$m silica grains provides a value of:

$$Wr=137 \text{ J/m}^2.$$

5) Sandblasting, with 250 $\mu$m alumina grains, of a surface already brush-coated with a deposit of silane and then of primer, both liquids left evaporated, provide a value of:

$$Wr=75 \text{ J/m}^2.$$

6) Sandblasting, with 250 $\mu$m alumina grains, of a surface already brush-coated with a deposit of silane and then of primer, both in the liquid state, leads to a rupture energy of:

$$Wr=135 \text{ J/m}^2.$$

7) Results obtained by using the sequential principle marketed by the company ESPE (method ROCATEC):

$$Wr=180 \text{ J/m}^2.$$

III—Examples 1 to 11 According to the Invention

Example 1

Alumina Particles of Size Equal to 250 $\mu$m Physically Microencapsulated with a View to Carrying Out a Sticking-efficient <<Mechano-chemical>> Sandblasting 500 g of alumina particles of polyhedral shape of average size equal to 250 $\mu$m were subjected to physical microencapsulation operations and this, so as to obtain two successive strata:

stratum 1 (internal stratum) constituted by a deposit, at 85° C., of trimethoxysilylpropyl methacrylate (promoter) which leads to a theoretical deposit of 9.0%, stratum 2 (external stratum) deposit at 35° C. of 225 g of EUDRAGIT® NE 30 D (primer), i.e. of a copolymer of ethyl acrylate and of methyl methacrylate in 30% dispersion in water with a surfactant (1.5% of Nonoxinol 100).

The theoretical deposit is in this case 12%.

As a general rule, during the physical microencapsulation operations, the following conditions were used:

flow rate of air carrying the solid particles: from 50 to 80 m$^3$/h;

atomisation pressure: of the order of 2 bars;

pulverisation speed at the injector nozzle: estimated at 5 ml/min.

The particles thus microencapsulated served for the mechano-chemical sandblasting of batches each formed of 20 titanium (T40) test-tubes of dimensions 40×5×2.5 mm.

DCB tests gave, as average value:

$$Wr=360 \text{ J/m}^2.$$

Example 2

Alumina Particles of Size Equal to 250 $\mu$m Physically Microencapsulated with a View to Carrying Out a Sticking-effective Mechano-chemical Sandblasting The same experimental procedure as that of Example 1, with the same rate of covering but a stratum 2 constituted of another acrylate EUDRAGIT® L 30D leads, during the DCB tests, to an average value of:

$$Wr=350 \text{ J/m}^2.$$

Example 3

Alumina Particles of Size Equal to 125 $\mu$m Physically Microencapsulated with a View to Carrying Out a Sticking-effective Mechano-chemical Sandblasting The same protocol as that described in example 1 was carried out on alumina grains of average size equal to 125 $\mu$m:

the theoretical deposit in the stratum 1 is equal to 10%, the theoretical deposit in the stratum 2 is equal to 11%.

DCB tests on batches of 20 test-tubes provided, as average value:

$$Wr=280 \text{ J/m}^2.$$

Example 4

Alumina Particles of Size Equal to 125 $\mu$m Physically Microencapsulated with a View to Carrying Out a Sticking-effective Mechano-chemical Sandblasting The same protocol as that described in Example 2 provides, for alumina grains of 125 $\mu$m, an average value of:

$$Wr=330 \text{ J/m}^2.$$

Example 5

Silica Particles of Average Size Equal to 250 $\mu$m Physically Microencapsulated with a View to Carrying Out a Sticking-effective Mechano-chemical Sandblasting The same experimental procedure as that described in Example 1 was this time adapted to the physical microencapsulation of silica particles of average size equal to 250 $\mu$m:

the theoretical deposit de the stratum 1 is 10%,
the theoretical deposit of the stratum 2 is 13.4%.

The associated rupture energy, measured on the 10 titanium test-tube couples, is:

$$Wr=385 \text{ J/m}^2.$$

Example 6
Silica Particles of Average Size Equal to 125 μm Physically Microencapsulated with a View to Carrying Out a Sticking-effective Mechano-chemical Sandblasting In this example, the silica particles of size equal to 125 μm were microencapsulated only by the same silane as that described in Example 1.

The mechano-chemical sandblasting carried out with this sand coated with a single stratum provided, on 10 couples of test-tubes stuck together, the following average value:

$$Wr=275 \text{ J/m}^2.$$

Example 7
Alumina Particles of Average Size Equal to 125 μm Physically Microencapsulated with a View to Carrying Out a Sticking-effective Mechano-chemical Sandblasting In this example, the alumina particles of average size equal to 125 μm were microencapsulated with a single stratum made of an acrylic compound (EUDRAGIT® 30 D55) without prior silane deposit.

The mechano-chemical sandblasting carried out with these particles provided, on 10 couples of test-tubes stuck together, the following average value:

$$Wr=320 \text{ J/m}^2.$$

Example 8
Alumina Particles of Average Size Equal to 250 μm Physically Microencapsulated with a View to Carrying Out a Sticking-effective Mechano-chemical Sandblasting In this example, the alumina particles of average size equal to 250 μm were microencapsulated with a single stratum made of a acrylic compound (EUDRAGIT® 30 D55) without prior silane deposit.

The mechano-chemical sandblasting carried out with these particles provided, on 10 couples of test-tubes stuck together, the following average value:

$$Wr=365 \text{ J/m}^2.$$

Example 9
Alumina Particles of Average Size Equal to 0.5 μm Chemically Microencapsulated with a View to Carrying Out a Sticking-effective Mechano-chemical Sandblasting This time, the experimental protocol is the following:

Alumina powder is dried beforehand so as to remove water molecules present on the surface which might prevent the grafting of the silane (promoter) selected in Example 1.

The grafting of the silane onto the alumina is carried out by heating under reflux a mixture of alumina, silane and anhydrous toluene.

The alumina thus modified is then purified by extraction, and then dried under vacuum.

The encapsulation proper is carried out by radical polymerisation in suspension of methyl methacrylate (MMA) around mineral particles modified using benzoyl peroxide as initiator and PVA as colloid protector.

All the reagents (water, PVA, initiator, MMA, $Al_2O_3$) are introduced into a reactor heated to 90° C. in which an anchor-type stirrer turns at the speed of 750 rpm.

After three hours of reaction, the product is recovered, washed with hot water, filtered and dried in the oven for one day.

The associated values of rupture energies are, for 20 test-tubes tested:

$$Wr=255 \text{ J/m}^2.$$

Example 10
Alumina Particles of Average Size Equal to 0.5 μm Chemically Microencapsulated with a View to Carrying Out a Sticking-effective Mechano-chemical Sandblasting In this Example, only the encapsulation by the method of polymerisation in suspension, described in Example 9, was carried out without the prior implementation of a silanisation (promoter).

The data pertaining thereto give, on 10 batches of coupled test-tubes, the average experimental value of:

$$Wr=140 \text{ J/m}^2.$$

Example 11
Alumina Particles of Average Size Equal to 100 μm physically Microencapsulated with the Aid of a PMMA Envelope with the View to Carrying Out a Sticking-efficient Mechano-chemical Sandblasting In this example, alumina particles of average size equal to 100 μm were microencapsulated with a single stratum made from an oil-in-water emulsion of PMMA (polymethylmethacrylate) stabilised by various surfactants.

To do this, a solution was first of all made of 50 g of PMMA in 250 ml of ethyl acetate, with stirring and at ambient temperature.

Masses of 0.25 g of surfactants (Montanox® (SEPPIC), Triton® (Fluka), Pluronic® (Fluka), PMMA-POE block copolymer) were simultaneously dissolved in 25 g of water with stirring at a temperature not going beyond 40° C.

The emulsion of the PMMA stabilised by the surfactants used for the microencapsulation is carried out with the aid of an ultra-turrax (24,000 rpm) having the aqueous solution surfactant. Into this stirred solution, 25 g of the solution of PMMA in ethyl acetate is incorporated dropwise into the preceding solution.

After the addition of the PMMA solution, the emulsion is homogenised for 15 minutes with the aid of the ultra-turrax with a rotation speed of 24,000 rpm.

This emulsion thus prepared, as a function of the surfactant retained, is poured into a closed graduated test tube.

The stability of the emulsion is evaluated by visual inspection. The results obtained are grouped together in the Table below.

| SURFACTANT | STABILITY TIME |
| --- | --- |
| Triton ® X-45 (Fluka) | 3 hours |
| Montanox ® 65 (SEPPIC) | 12 hours |
| Montanox ® 60 (SEPPIC) | 4 days |
| Montanox ® 80 (SEPPIC) | 5 days |
| Triton ® X-405 (Fluka) | >8 days |
| Pluronic ® F68 (Fluka) | >8 days |
| PMMA-b-POE | >8 days |

On these bases, the particles were microencapsulated preferably with the aid of emulsions stabilised with the aid of Triton® X-405 or with Pluronic® F-68.

The mechano-chemical sandblasting carried out with these particles gave, on 20 couples of tubes stuck together, the following average value:

$$Wr=350 \text{ J/m}^2$$

and this, whatever the emulsion used was.

Figure 2:
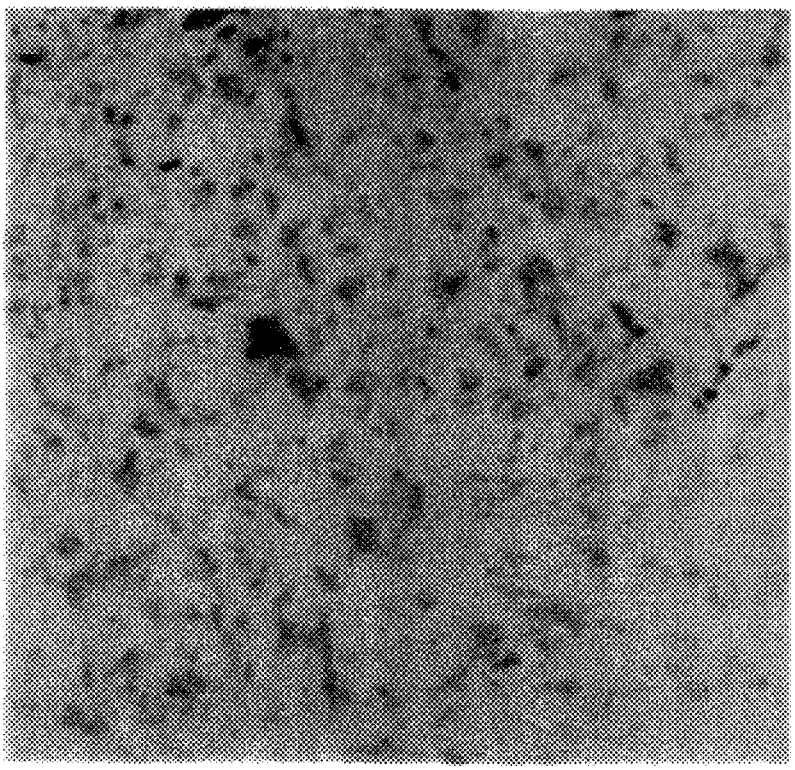

FIGS. 1 and 2 illustrate the process developed in accordance with the present invention, its a first embodiment intended to improve the surface properties of a material.

More specifically: FIG. 1 is an image obtained by cathodoluminescence spectrometry and shows the encrustation of fragments of ceramic material of the alumina type resulting from projection of granules of average size equal to 250 $\mu$m onto a titanium target; FIG. 2 is an image which is similar to FIG. 1 after projection of granules of the same type of average size equal to 50 $\mu$m onto a titanium target.

ESCA spectrometry (XPS) analyses confirmed the presence of polymer material at the surface of the titanium forming the target after projection of alumina granules microencapsulated with an envelope of acrylic material.

As the Figures show, the process according to the present invention thus enable concomitantly causing a mechano-chemical action consisting:

firstly, of the creation of surface roughness by encrustation of fragments of particles retained at the surface of the target due to their intrinsic fragility; and secondly, the simultaneous encrustation of fragments of polymer material enabling for example the adhesion during further sticking operations.

As is understood, the process which has just been described can find numerous applications.

In addition to those cited in the introduction, mention can be made of sandblasting of building facades with the view to improving the adherence of coatings or paints with semi-permeable properties, or even with the view to minimising <<graffiti>>-type inscriptions by the implementation of adhesive <<anti-graffiti>> coatings.

What is claimed is:

1. A method of mechano-chemically treating a material for improving surface properties thereof by mechano-chemical anchoring, comprising projecting onto said material particles having stratified structure comprising a core and a coating comprising at least one polymer with or without a chemical agent, said projecting optionally causing fracturing of said particles into fragments upon impact and causing said particles and/or fragments to at least partially penetrate into said material.

2. A method of mechano-chemically treating a material, for improving adherence during subsequent assembling by mechano-chemical anchoring, comprising projecting onto said material particles having stratified structure comprising a core and a coating comprising at least one polymer with or without a chemical agent, said projecting optionally causing fracturing of said particles into fragments upon impact and causing said particles and/or fragments to at least partially penetrate into said material.

3. The method according to claim 2, wherein the particles are projected onto said material under conditions such that said particles fragment during impact and become encrusted in said material.

4. The method according to claim 3, wherein the material to be treated is selected from the group consisting of a metallic material, a ceramic, a polymer and a calcified material.

5. The method according to claim 3, wherein the material to be treated is a metallic material.

6. The method according to claim 3, wherein the core of the particles comprises a material which fragments under impact.

7. The method according to claim 6, wherein said material which fragments under impact is selected from the group consisting of steel, cast iron and glass.

8. The method according to claim 3, wherein the core of said particles is a ceramic.

9. The method according to claim 2, wherein the coating of the particles comprises one or more strata comprising a polymer of a chemical family which is analogous to that of a polymer constituting a second assembling material.

10. The method according to claim 9, wherein the coating comprises at least two layers, including a first layer immediately in contact with the core comprising at least one chemical agent for increasing adherence between said first layer and said core, or between said layers.

11. A method of mechano-chemically treating a material, to improve properties in use by depositing a surface covering of composite structure, comprising projecting onto said material particles having stratified structure comprising a core and a coating comprising at least one polymer with or without a chemical agent, said projecting optionally causing fracturing of said particles into fragments upon impact and causing particles and/or fragments to at least partially penetrate into said material.

12. The method according to claim 11, wherein the particles are projected onto said material to be treated under conditions such that said particles fully penetrate into said material without significantly fragmenting.

13. The method according to claim 12, wherein the material to be treated is selected from the group consisting of a polymer material and a biomaterial.

14. The method according to claim 13, wherein said polymer material is selected from the group consisting of polytetrafluoroethylenes, silicones and polyurethanes.

15. The method according to claim 12, wherein the core of the particles comprises a material selected from the group consisting of a ceramic material, a metallic material, a plastic material and a sandblasting agent.

16. The method according to claim 15, wherein said ceramic material is selected from the group consisting of carbides, nitrides, oxides, carbonitrides and mixtures thereof.

17. The method according to claim 15, wherein said metallic material is selected from the group consisting of copper, aluminum, transition metals, and alloys thereof, wherein said transition metals are selected from the group consisting of metals of series 3d and 4f of the Periodic Table.

18. The method according to claim 15, wherein said sandblasting agent is selected from the group consisting of kaolin and refractory materials.

19. The method according to claim 12, wherein the material to be treated is a polymer covering for a mono- or multi-layered structure, and wherein the coating of the particles comprises at least one layer comprising a polymer of the same type as said covering.

20. The method according to claim 19, wherein the coating comprises at least two layers, including a first layer immediately in contact with the core comprising at least one chemical agent for increasing adherence between said first layer and said core, or between said layers.

* * * * *